May 15, 1956     G. R. FEASTER     2,746,010
IGNITION SYSTEM TESTER
Filed Nov. 26, 1951
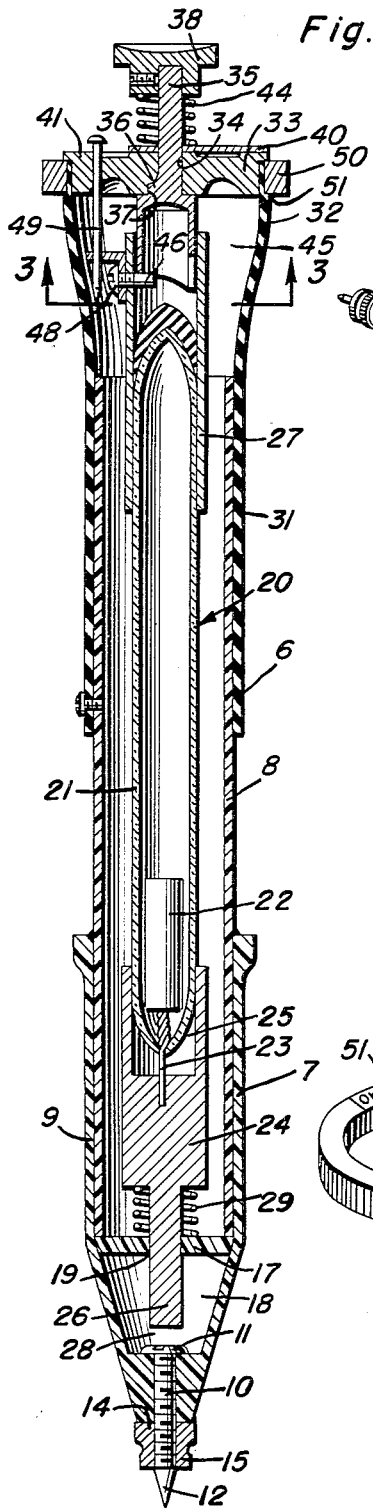
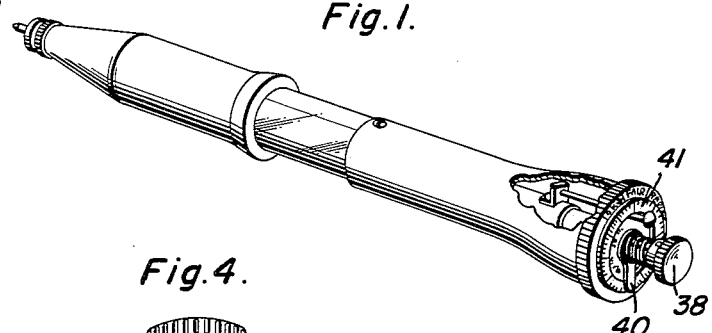
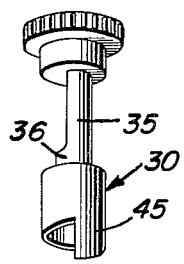
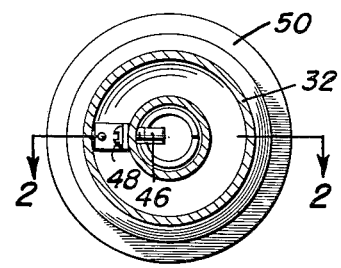
Guy R. Feaster
INVENTOR.
BY
*Clarence A. O'Brien*
*and Harvey B. Jackson*
Attorneys

# United States Patent Office 2,746,010
Patented May 15, 1956

2,746,010

IGNITION SYSTEM TESTER

Guy R. Feaster, Manhattan Beach, Calif.

Application November 26, 1951, Serial No. 258,206

5 Claims. (Cl. 324—17)

This invention relates to ignition system and spark plug testers of the type using a gas filled discharge tube held by the operator which is applied against the terminal of the plug or against any other part of the system under test. Indicators and testing devices of this type usually do not indicate whether sparks are actually passing the gap of the spark plug, but merely detect the presence of a sufficiently high potential. Special constructions have therefore been designed to test the actual working of spark plugs and other parts of the ignition system when in the cylinder of an internal combustion engine while the latter is running.

Such a construction has been described in applicant's co-pending application Serial No. 57,231, now Patent No. 2,576,109. However, while the information obtained by constructions of this type is certainly valuable and permits to locate a number of faults and defects and their cause, the manipulation of the testing instrument requires some skill and experience especially as the interpretation of the information received varies with the type of car and of ignition system and with other factors. Moreover, the use of a galvanometer, as suggested in the above referred earlier Patent No. 2,576,109, while adding to the precision of the indication received, also increases the cost of the instrument.

It is therefore the main object of the invention to provide a compact ignition system and spark plug tester of the above indicated type in the shape of a hand instrument of a simplified and inexpensive construction, permitting frequent and recurrent testing which is capable of being quickly applied during the operation of the internal combustion engine of which the ignition system forms a part and which is further capable of furnishing reliable indications permitting to check the operation and to locate immediately the cause of any fault or irregularity which has been observed without additional test work or calculation.

It is a further principal object of the invention to provide an ignition tester of the type above mentioned which may be preadjusted for the type of equipment used so that the indications received may be directly applied and indicate correct or faulty operation of the engine while running without any further reduction, calculation or interpretation.

More specific objects of the invention are explained in detail in the following specification.

According to the invention the voltage applied to a discharge tube filled with a neon gas is used for the indication of the condition of the ignition system in series with a finely adjustable gap, the fine adjustment of which permits to set the instrument for normal conditions of a certain type of car or of a certain type of ignition system.

The fine adjustment of the gap may either be used for the purpose of eliminating the necessity of paying attention to the individual factors which accompany testing of an individual system or car or this adjustment may be used to bring the indicator back to a standard condition, with the extent of the adjustment indicating the nature of a fault or the location of a fault. Both methods may also be combined. The indication obtained is thus more reliable and more informative and it permits the checking of the conditions of a larger number of elements of the ignition system.

The invention is illustrated in the accompanying drawings showing one embodiment thereof. It is however to be understood that the embodiment of the invention which has been shown in the drawings has been selected in order to explain the principle of the invention and the best mode of applying said principle. No survey of possible modifications is given in the specification and a departure from the embodiment which has been illustrated in the drawings is not necessarily a departure from the principle of the invention.

In the drawings:

Figure 1 is a perspective view of the ignition tester;

Figure 2 is an elevational sectional view of the ignition tester the section being taken along the median plane passing through the axis of the instrument;

Figure 3 is a sectional plan view the section being taken along line 3—3 of Figure 2;

Figure 4 is a perspective view of the cam cylinder and of the members attached thereto;

Figure 5 is a perspective view of the indicator ring.

The testing instrument according to the invention is a hand instrument which has to be held by the operator and it comprises a tube 6 hereinafter termed the upper tube as it forms that part of the instrument which during use is turned towards the operator and which is made of insulating material so as to be capable of serving as a handle. Further the instrument comprises a tube 7, hereinafter termed the lower tube because during use it is close to the part of the ignition system to be tested, said lower tube being arranged at a distance from the upper tube. Between the upper tube 6 and the lower tube 7 a cylindrical tube 8 made of a transparent material such as glass or plastic is held. The lower tube 7 has a cylindrical section 9 into which the glass tube 8 is inserted and a conical section with a flattened end and bottom portion 14. Through this flattened end portion a test pin 10 projects which may be provided with a flat head 11 and which is preferably threaded. The test pin 10 may be pointed (at 12) at its projecting end and it is held in the center of the flattened portion 14 of the conical section by means of an internally threaded sleeve 15 which may be knurled at the outside.

A disk 17 is inserted into the interior of the lower tube 7 at the junction between its cylindrical section 9 and its conical section, against which disk the end of the glass tube 8 abuts. The disk 17 may be provided with a central aperture 19 for a purpose which will be described below.

In the interior of the glass tube 8 and preferably coaxial therewith a neon filled discharge tube 20 is arranged. This tube is of a known type and it consists of an evacuated and neon gas filled cylindrical glass bulb 21 provided with an inner electrode 22 arranged in the interior of the bulb from which a sealed in wire 23 leads to the outside. On the other side of the discharge tube however the bulb carries an outer electrode 27 which surrounds the bulb and which is cemented or otherwise attached to the said bulb of the discharge tube.

It will be noted that between the upper and lower tubes 6 and 7 respectively a section of the glass tube 8 is exposed through which the discharge tube and the electric charge passing the same may be observed; preferably the lower portion of the discharge tube which contains the inner electrode 22 is thus made visible.

The lower end of the discharge tube from which the sealed in electrode wire 23 projects is inserted into and held within the hollow cylindrical sleeve-like end of an intermediate electrode 24 with which the sealed in electrode 22 is in operative connection, for instance, by inserting the outer end of wire 23 into a recess or bore of the intermediate electrode 24 and fixing the wire thereby soldering.

The intermediate electrode 24 has a body portion with a cylindrical cavity 25 on one end and with a projecting rod 26 on the other end which is tightly fitted into the aperture 19 of the disk 17. The end of said rod 26 forms a gap electrode facing the head 11 of the test pin 10 which forms the second electrode of the gap. Any current passing the test pin has therefore to pass the gap 28 between the rod 26 and the head 11 of the test pin before reaching the discharge tube. The disk 17 closes the lower portion of the tube 7 tightly so that a chamber 18 is formed which may be filled with a non-conducting oil, if desired, to provide a constant resistance across the gap and to avoid oxidation.

The gap is made adjustable and for this purpose the intermediate electrode body 24 is pressed toward the end of the discharge tube 20 by means of a spring 29 which may be inserted between the disk 17 and the body 24 of the intermediate electrode. It will thus be clear that if the neon filled discharge tube is pressed towards the test pin 10 the length of the gap will be reduced while relaxing of the pressure will cause a widening of the gap 28.

The upper tube 6 has a cylindrical portion 31 jointed to a flared end section 32 which supports and is closed by an indicator disk 33. The disk has a central aperture 34 through which the stem 35 of a gap adjusting cam cylinder 30 passes. The said stem 35 may move longitudinally and it may also be rotated, but only after having been pushed down to a certain extent, this being achieved, for instance, by providing the stem with a projection 36 fitting into a suitable recess 37 of the disk 33 which projection leaves the recess as soon as the cylinder is pressed down.

The stem 35 carries a knurled head or knob 38 which is fixed to it by means of a set screw or the like. It is moreover provided with a pointer 40 moving over an indicator dial 41 which is provided on the upper and outer face of the closing disk 33. A coil spring 44 surrounds the stem 35 and is inserted between the knob 38 and the surface of the disk 33.

At the end of the stem 35 a hollow cam cylinder 45 is arranged which has been cut along a curved path so that a stepped cam surface is formed at the end of the cylinder which cooperates with a stud or pin member 46 projecting from and fixed to the upper electrode 27 of the discharge tube. The stud or pin 46 projects into the interior of the upper part of said outer cylindrical electrode which therefore projects beyond and above the end of the discharge tube. The gap adjusting cam cylinder 45 reaches down into the interior of the hollow cylindrical outer electrode 27 and is in operative contact with the stud or pin 46. A contact between the two parts 46 and 45 is permanently maintained by means of the small spring 29 which presses the intermediate electrode block 24 upwardly, thus exerting an upward pressure on the discharge tube and on the outer electrode 27 of the same which carries the stud or pin 46. It will also be clear that by pressing the knob 38 downwardly against the action of spring 44, the projection 36 on stem 35 is disengaged from the recess 37 and the operator may turn the knob and the cam cylinder 45 with it. The cam surface when turned moves the pin or stud 46 to a higher or lower level against the action of the spring 29 and thereby the outer electrode and with it the entire discharge tube 20 and the intermediate electrode 24 is moved which movement is transmitted to the spark electrode 26, thus adjusting the width of the gap 28.

The adjustment which has been made by the operator by turning the knob 38 of the assembly 30 will be visible as the pointer 40 moves over the dial 41 during such operation. When the stem and knob is rotated the position of the pointer on the dial therefore indicates the adjustment of the gap 28. A suitable graduation of the dial indicates the position which the gap electrode 26 has reached with respect to the head 11 of the testing pin 10.

The outer electrode 27 of the discharge tube is moreover provided with an angle piece 48 which may be held in its position by the stud or pin 46 and which is connected by means of a wire or by means of a pin 49 with the metallic disk 33 covering the upper tube. This connection permits to ground the discharge tube over the hand and body of the operator when the latter seizes the outer tube and holds one of its fingers on the knob 38 which is in contact with the disk 33.

On the outside of the upper tube and close to the metallic disk 33 an indicator ring 50 is rotatably mounted, said ring being preferably seated in a shallow recess of the upper tube 6. Said ring is preferably rotatable around the upper tube with some friction. A small lip of the disk 33 may slightly project over the upper surface of the ring so that the ring is firmly held when the instrument has been assembled and is secured against rotation by friction. The ring carries markings 51 and moreover zones have been marked off on the upper surface of the ring in order to indicate the state in which the tested parts are in.

In order to understand the operation more fully it may be mentioned that the instrument may serve to check the operation of the ignition system of an internal combustion engine while said engine is actually running. Faults in the ignition system under these conditions are dependent on the voltage which is developed at the spark plug during the operation and this voltage in its turn is determined by four factors which are the voltage developed at the ignition coil, the compression of the engine under test, the spark plug gap and the spark plug insulation.

It will be clear that the value of the voltage developed by the ignition coil varies with the type of coil used or with the compression used and both these factors therefore vary with the type of car carrying the ignition system under test. It is therefore a great advantage to make an adjustment which permits to adjust the testing instrument in such a manner that merely deviations from the normal state are registered or announced, thus relieving the operator from the necessity to reconstruct the state in which the spark plug or any other element is in by applying a correcting factor which varies with the type of car and expresses merely the variation which is due to the change from one type of ignition system to another system.

The actual testing may be carried out in two different manners. If the user and operator is a car owner who tests always the same ignition system, it is preferable to proceed by inserting a completely new and tested spark plug into one cylinder of the engine with the engine running at idle speed. The test instrument is then applied to the new spark plug and the knob 38 is turned and gap 28 is adjusted until the neon bulb ceases to pass a discharge. This setting is then the standard setting for the type of car or engine under test. Any spark plug which continues to produce a visible discharge in the neon bulb with this adjustment of the testing instrument is defective. The degree of defectiveness is determined, if desired, by turning the knob 38 until the neon light bulb is again extinguished. The extent of the readjustment corresponds to the difference of voltage necessary for producing a spark in the new spark plug and in the one under test.

If the instrument is used in a repair shop where different types of cars and engines have to be tested, it is preferably to test each type of car or engine with a new spark plug and to make a record of the pointer readings thus obtained. The testing for a definite type is then conducted by starting with a position of the pointer which corresponds to the records. The further testing operation is conducted in the same way which has been described.

When the indicator ring 50 is used, the operator when first using the testing instrument on a certain type of car, proceeds in the manner above indicated by inserting a new spark plug and by turning the knob to the point where the glow charge in the neon tube disappears. The indicator ring is now turned by hand until the mark 51 coincides with the position of the pointer. The test instrument is thereby set for the particular type of car or engine. The spark plugs in the engine are now checked in the same manner. When the readings thus obtained fall into the zone, usually marked by a distinctive color, which is designated by the letters "OK" the plug operates normally. When the pointer reading falls into the zone which is marked "Fair" in the drawing the plug is still sufficiently good for operation although defective. If the pointer reading falls in the zone marked "Replace" the plug is foul and should be replaced.

The instrument will in a like manner also permit to check secondary circuits for leakage or breakage or will locate other defects of a system operating under high tension.

It will be clear that unessential parts of the instrument may be modified or changed without departing from the essence of the invention as defined in the annexed claims.

Having described the invention, what is claimed as new is:

1. A spark plug and ignition system tester, comprising an insulating and partly transparent pencil-shaped casing structure, a neon filled gas discharge tube held within said structure and provided with an inner electrode in the discharge space and an outer electrode surrounding said discharge tube, a test pin held within and projecting at one end from the pencil-shaped casing structure, adapted to be applied against an element of the system to be tested and having an electrode surface within said pencil-shaped casing structure, an intermediate electrode fixedly connected with the inner electrode of the discharge tube, and having an electrode surface, facing the electrode surface of the test pin, but spaced therefrom by a gap, a metal disk at the other end of the pencil-shaped casing structure, a finger knob conductively connected with said disk for contact with one finger of the operator holding the pencil-shaped casing structure in his hand, an adjusting means for adjusting the position of the discharge tube and connected electrode within the holding structure, a conducting connection between said disk and the outer electrode of the neon filled discharge tube, a dial on said metallic disk, an indicating pointer connected with said adjusting means and moved over said dial, the finger of the operator applied to the finger knob and the body of the operator closing a test circuit from the test pin, applied to the part of the system under test, over the gap and the discharge tube to the metallic disk and knob, the pointer and dial indicating the width of the gap.

2. A spark plug and ignition system tester, as claimed in claim 1, wherein the adjusting means for adjusting the position of the intermediate electrode include a cam cylinder, means for rotating the same, held by the metallic disk and including a stem connected with the finger knob, said rotating means carrying the pointer moving over the dial, and a guide pin carried by the outer electrode, cooperating with said cam cylinder.

3. A spark plug and ignition tester as claimed in claim 1, wherein the electrode facing the test pin and spaced from the same by a gap is arranged within a leak proof chamber filled with a non-conducting oil.

4. A spark plug and ignition system tester, comprising a gas filled discharge tube with an outer and an inner electrode, and a pair of spaced air separated electrodes in series with the said discharge tube, the latter and one of the air spaced electrodes forming a unit, an insulating partly transparent pencil-shaped casing concentric with said discharge tube and surrounding the said unit, provided on one end with an outwardly projecting test pin having an inwardly turned portion forming the second electrode of the pair, a cap at the other end of the said pencil-shaped casing, carrying a combined ground connection and indicator assembly, said assembly including a stem rotatable within the cap and carrying a pointer and a dial carried by the cap, means for connecting the outer electrode of the discharge tube with said cap, a displacing cam surface connected with said rotatable stem displacing the entire unit, consisting of the discharge tube and one of the electrodes, upon rotation of the stem, the pointer carried by the stem indicating the extent of the displacement which determines the length of the air gap between the electrodes in series with said discharge tube, said stem being in contact with the body of the operator during operation and being thus grounded, the voltage condition of the spark plug and ignition system tested being indicated by the appearance and disappearance of a discharge in the gas filled discharge tube and the pointer position.

5. A spark plug and ignition system tester, comprising an insulating and partly transparent pencil-shaped casing structure, a neon filled gas discharge tube held within said structure and provided with an inner electrode in the discharge space and an outer electrode surrounding said discharge tube, a test pin held within and projecting at one end from the pencil-shaped casing structure, adapted to be applied against an element of the system to be tested and having an electrode surface within said pencil-shaped casing structure, an intermediate electrode fixedly connected with the inner electrode of the discharge tube, and having an electrode surface facing the electrode surface of the test pin, but spaced therefrom by a gap, a metal disk at the other end of the pencil-shaped casing structure, a finger knob conductively connected with said casing for contact with one finger of the operator holding the pencil-shaped casing structure in his hand, an adjusting means for adjusting the position of the discharge tube and the connected electrode within the holding structure, a conducting connection between said disk and the outer electrode of the neon filled discharge tube, a dial on said metal disk, an indicating pointer connected with said adjusting means moved over the dial, and a manually operated rotatable indicator ring surrounding the dial and provided with indicating zone marks adapted to cooperate with the indicating pointer, said ring being set by the operator for a given ignition system in order to indicate the condition of the system, the finger of the operator applied to the finger knob, and the body of the operator closing a test circuit from the test pin which is applied to the system under test, over a circuit including the gap, the discharge tube, the metallic disk, and the knob.

References Cited in the file of this patent

UNITED STATES PATENTS

| 1,913,155 | Ferguson | June 6, 1933 |
|---|---|---|
| 1,991,451 | Elderkin | Feb. 19, 1935 |
| 2,256,086 | Guziel | Sept. 16, 1941 |

FOREIGN PATENTS

| 206,216 | Great Britain | Oct. 31, 1923 |